United States Patent [19]
Brown et al.

[11] Patent Number: 5,634,736
[45] Date of Patent: Jun. 3, 1997

[54] QUICK-DISCONNECT COUPLING DEVICE

[75] Inventors: Eric A. Brown, Belvue; James G. Nickels, Manhattan; Howard T. Koshi, St. George, all of Kans.

[73] Assignee: Caterpillar Inc., Peoria, Ill.

[21] Appl. No.: 565,694

[22] Filed: Nov. 29, 1995

[51] Int. Cl.$^6$ ............................. E02F 3/96; E02F 9/00
[52] U.S. Cl. ....................... 403/322; 403/319; 414/723
[58] Field of Search ...................... 403/319, 321, 403/322, 325; 414/723; 172/272, 273; 37/468

[56] References Cited

U.S. PATENT DOCUMENTS

| | | | |
|---|---|---|---|
| 2,963,183 | 12/1960 | Przybylski | 414/723 |
| 3,272,264 | 9/1966 | Antolini | 172/273 |
| 4,042,131 | 8/1977 | Buttke | 214/138 |
| 4,187,050 | 2/1980 | Barbee | 414/723 |
| 4,278,368 | 7/1981 | Livesay | 404/117 |
| 4,332,094 | 6/1982 | Mieger | 414/723 |
| 4,944,628 | 7/1990 | Hulden | 403/24 |
| 5,232,502 | 8/1993 | Recker | 118/317 |

FOREIGN PATENT DOCUMENTS

| | | | |
|---|---|---|---|
| 2568956 | 2/1986 | France | 403/322 |
| 58-98532 | 6/1983 | Japan | 414/723 |

*Primary Examiner*—Anthony Knight
*Attorney, Agent, or Firm*—Larry G. Cain

[57] ABSTRACT

A quick-disconnect coupling device (12) for use with a power device (8) and for attaching a variety of attachments (18) to a stick (10) includes a pair of brackets (22) attached to the attachment (18), a frame assembly (40) being attached to the power device (8) and an activation device (80). The actuation device (80) having a plurality of linkage members (82) being positioned in a locked position (84) when the power device (8) is attached to the attachment (18) and being in an open position (83) when not being attached to the attachment (18). The linkage members (82) including a latch (130) having a pair of ends (132) being spaced apart and in the locked position (84) being in contacting relationship with the each of the pair of brackets (22).

10 Claims, 5 Drawing Sheets

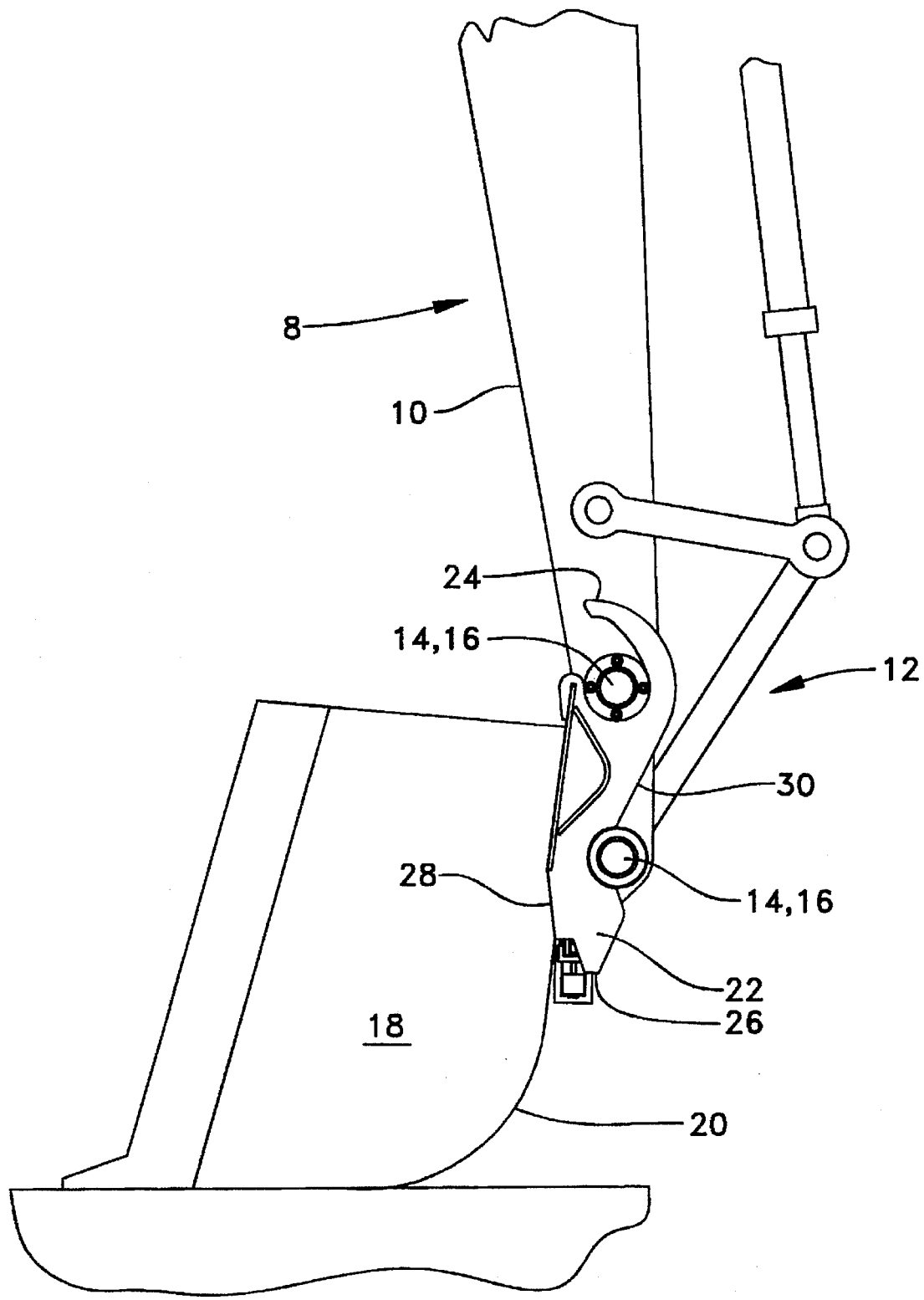
Fig_1_

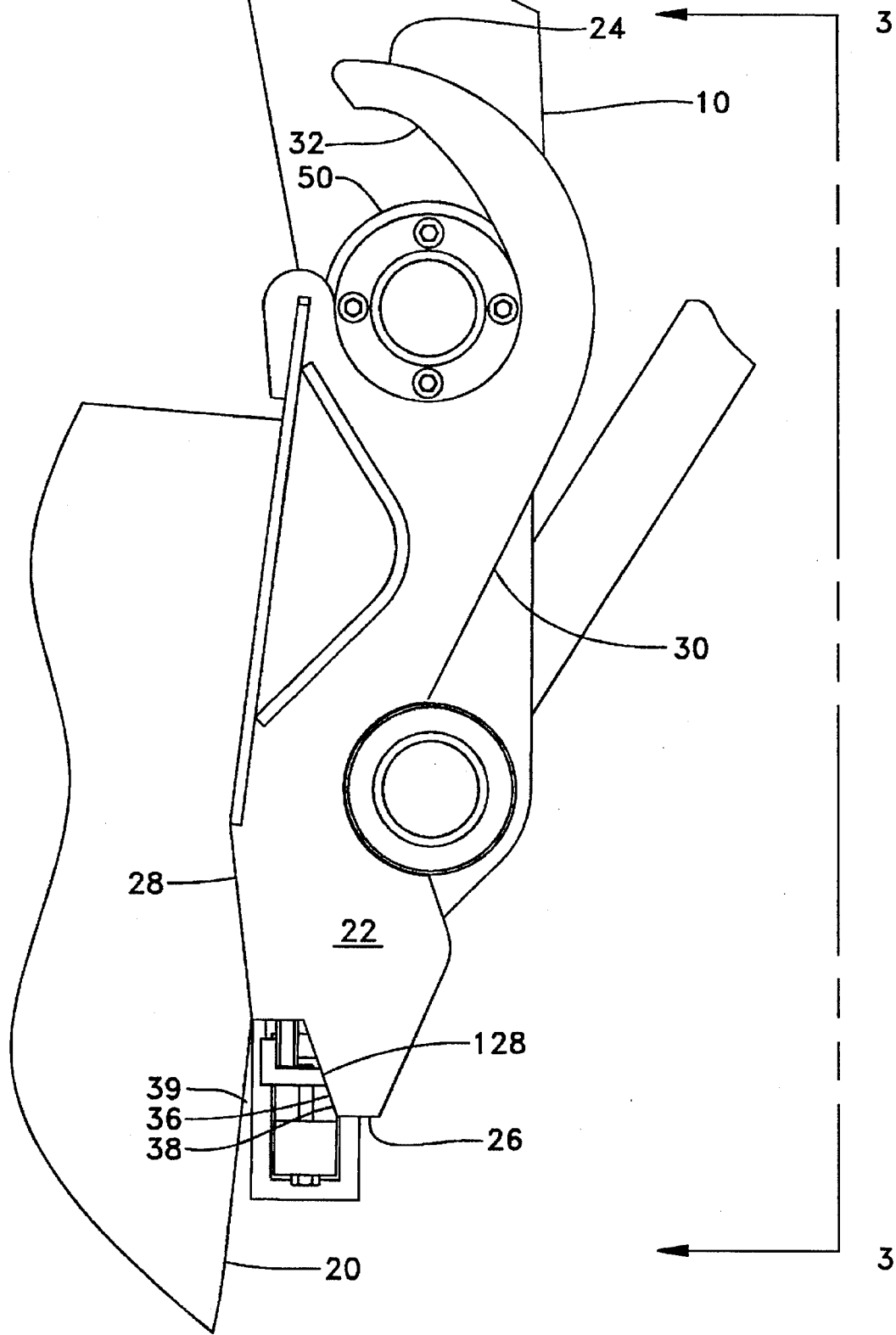
Fig_2

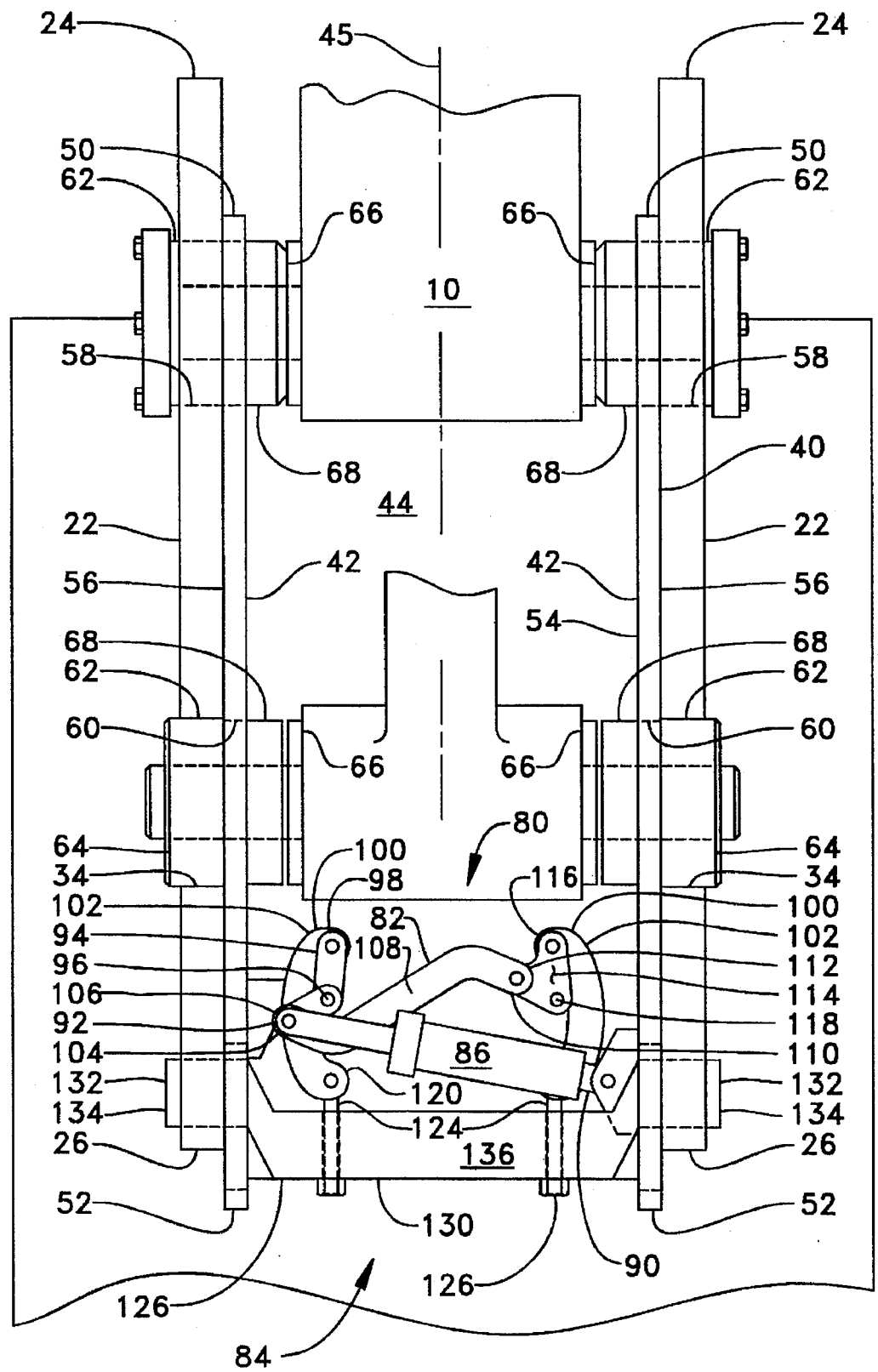
Fig_3

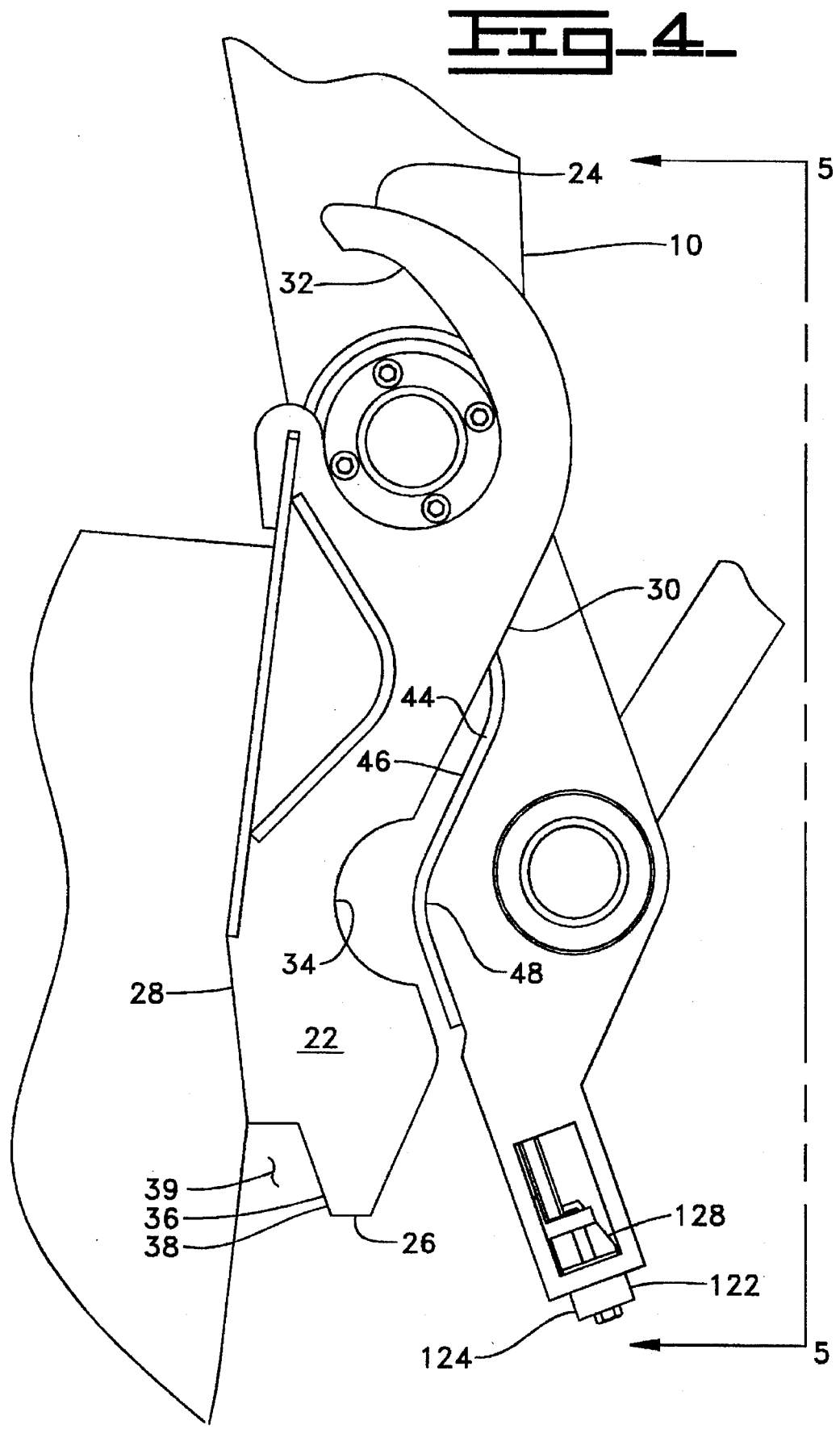

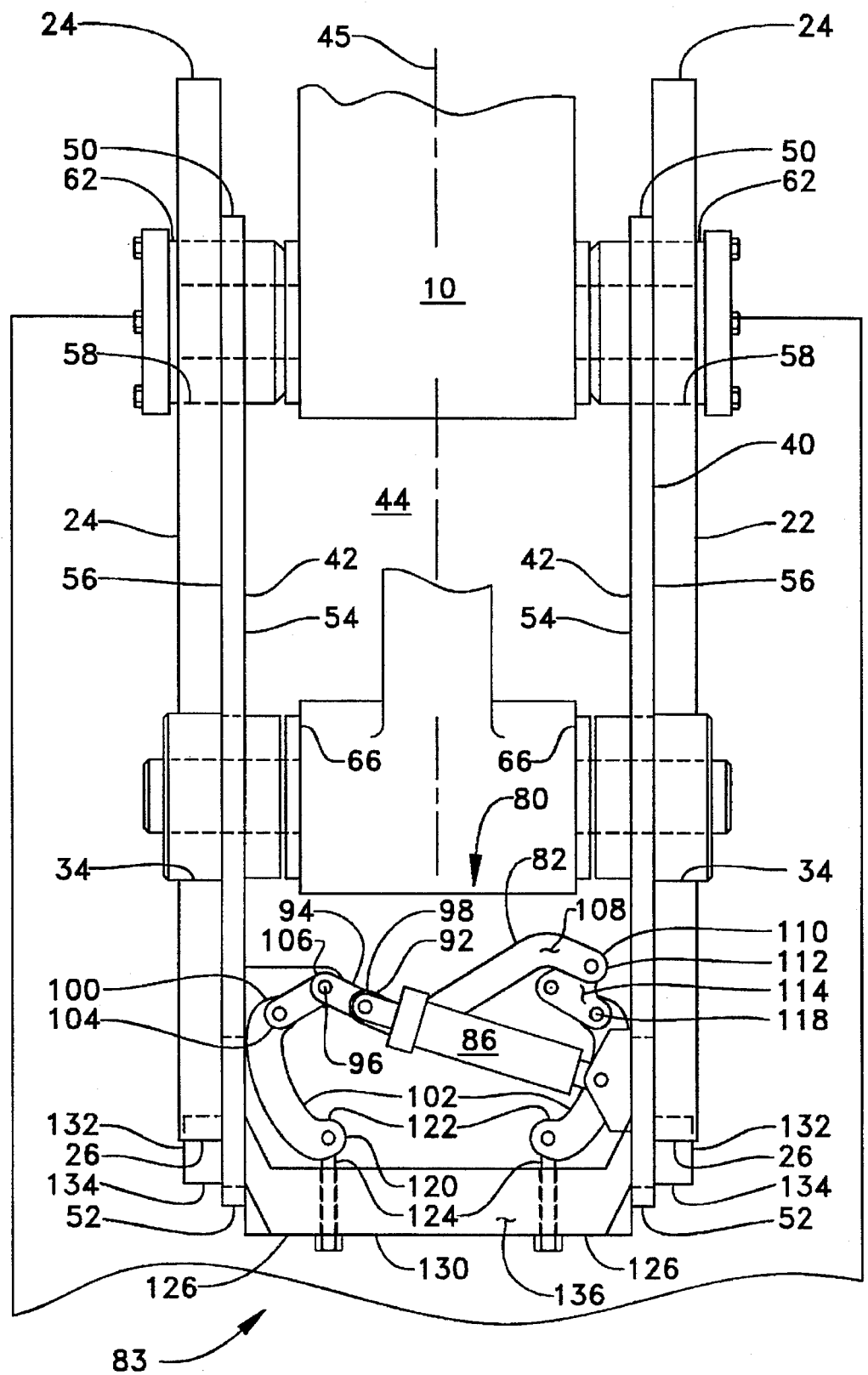

QUICK-DISCONNECT COUPLING DEVICE

TECHNICAL FIELD

This invention relates generally to quick-disconnect couplings and more particularly suited to couplings for affixing tools to an earth moving vehicle such as a stick of an excavator or backhoe.

BACKGROUND

In use, earth moving vehicles preform many different functions such as excavating dirt, rock and other material. For example, during the excavation operations different attachments may be required, such as a different size of bucket, an impact breaker or a grapple arrangement. Each of these attachments have a specific advantage of one verses the other. Thus, to be able to change from one attachment to another with ease and a limited waste of time is of the utmost importance.

To date, many of these changes require time-consuming manual processes involving the removal of force-fit pins or the like. Further specially fabricated adapters, or expensive and complex coupling devices which frequently require specially designed tools are used.

Furthermore, some of the coupling devices are actuated by hydraulic cylinders or such devices and require the device to be maintained under pressure to complete and maintain the attachment in the attached mode.

The present invention is directed to overcoming one or more of the above problems.

DISCLOSURE OF THE INVENTION

In one aspect of the invention, a quick-disconnect device is comprised of a pair of brackets being fixedly attached to an attachment, a frame assembly being attached to a power device and an activation device being attached to the frame assembly. The activation device removably attaches the frame assembly to the attachment. The activation device includes a plurality of linkage members being movable between an open position and a locked position. The plurality of linkage members define a link member having an over center or locking portion corresponding to the locked position. A locking member includes a latch having a pair of spaced apart ends which when in the locked position are in contacting relationship with the frame assembly.

BRIEF DESCRIPTION OF THE DRAWINGS

FIG. 1 is a side view of a typical excavator, shown schematically, having a stick embodying the present invention for mounting an attachment using a quick-disconnect device;

FIG. 2 is an enlarged side view of the quick-disconnect device having the attachment connected to the stick;

FIG. 3 is an enlarged view of the quick-disconnect device taken along line 3—3 of FIG. 2;

FIG. 4 is an enlarged side view of the quick-disconnect device having the attachment partially connected to the stick; and FIG. 5 is an enlarged view of the quick-disconnect device taken along line 5—5 of FIG. 4.

BEST MODE FOR CARRYING OUT THE INVENTION

In reference to FIGS. 1, 2 and 4, a power device 8, not shown in its entirety, which in this application includes, an excavator stick 10, not shown in its entirety, has a quick-disconnect device 12 attached to the stick 10 in a conventional manner, such as by a plurality of pins 14 and retainers 16. In the application shown, a bucket 18 is attached to the stick 10 by the quick-disconnect device 12. The bucket 18 includes a bowl member 20 having a pair of brackets 22 fixedly secured thereto. The pair of brackets 22 have a preestablished space therebetween and each of the pair of brackets 22 include an upper end 24, a lower end 26, a front side or surface 28 and a back side or surface 30. A pair of open ended elongate openings 32 being axially aligned are positioned near the upper end 24 and open at the front side 28 of the pair of brackets 22 and a pair of open-ended bores 34 being axially aligned are positioned near the lower end 26 and open at the back side 30 of the pair of brackets 22. The pair of open ended elongate openings 32 and the pair of open-ended bores 34 have a preestablished space therebetween. Each of the front sides 28 of the pair of brackets 22 further includes an inclined surface 36 defining a mating surface 38. The inclined surface 36 extends from the lower end 26 toward the upper end 24 a preestablished distance when in the assembled position forms a cavity 39 being interposed the pair of brackets 22 and the bowl member 20.

The quick-disconnect coupler 12 includes a frame assembly 40 being constructed of a pair of mounting plates 42 having a connecting plate 44 fixedly attached thereto and spacing each of the pair of mounting plates 42 one from the other a preestablished distance about a centerline 45. The connecting plate 44 defines a front side or surface 46 and a back side or surface 48. Each of the pair of mounting plates 42 include an upper end 50, a lower end 52, an inner side or surface 54 and an outer side or surface 56. A first pair of bores 58 being axially aligned are positioned near the upper end 50 of the pair of mounting plates 42 and a pair of second bores 60 being axially aligned are positioned near the lower end 52 of the pair of mounting plates 42. In the assembled position, the first pair of bores 58 are axially aligned with the open ended elongate openings 28 and the second pair of bores 60 are axially aligned with the pair of open ended bores 30 in the pair of brackets 22. In this application, the first pair of bores 58 and the second pair of bores 60 each have a cylindrical boss member 62 positioned within respective ones of the first pair of bores 58 and the second pair of bores 60. The cylindrical boss members 62 include an outer end 64, an inner end 66 and a stepped outer surface 68 having a first preestablished diameter positioned near the outer end 64 and extending axially from the outer end 64 a predetermined distance toward the inner end 66 and a second preestablished diameter being smaller than the first preestablished diameter extending axially from the first preestablished diameter to the inner end 66. Each of these cylindrical boss members 62 have one of the plurality of pins 14 positioned therein and the retainers 16 attach the quick-disconnect device 12 to the stick 10. As an alternative, the cylindrical boss members 62 can be rotatably or fixedly positioned within the first pair of bores 58 and/or the second pair of bores 60. And, if the cylindrical boss members 62 are rotatable, a conventional lubricating system can be used.

As an alternative to replaceable cylindrical boss members 62, the frame assembly 40 could include a cylindrical boss generally centered about the first pair of bores 58 and the second pair of bores 60 being attached to each of the inner sides 54 of each of the pair of mounting plates 42. Furthermore, the first pair of bores 58 and the second pair of bores 60 could each have a cylindrical boss 64 being slightly larger than the cylindrical boss 62 generally centered thereabout and being attached to each of the outer sides 56 of each of the pair of mounting plates 42. The cylindrical bosses would have a bore therein through which one of the plurality of pins 14 are positioned therein and the retainers 16 attach the quick-disconnect device 12 to the stick 10.

As best shown in FIGS. 3 and 5, attached to the connecting plate 44 on the back side 48 is an activation device 80 which include a plurality of linkage members 82 being movable between an open position 83 and a locked position 84. The open position 83 is at one end of the extremity of the movement of the plurality of link members 82 and the locked position is at the other extremity of the movement of the plurality of link member 82. The actuation device 80 is in communication with the operators station of the hydraulic excavator 8 by a conventional system, not shown. In this application, the plurality of linkage members 82 are activated by a hydraulic cylinder 86, but as an alternative could include any type of actuating device such as a manual lever, an air cylinder, or an electrical solenoid. The hydraulic cylinder 86 is of conventional design and includes a head end 90 being attached to one of the pair of mounting plates 42 in a conventional manner and a rod end 92 being connected to a portion of the plurality of linkage members 82 in a conventional manner. The rod being compressed moves the plurality of linkage 82 into the open position 83 and with the rod extended moves the plurality of linkage 82 into the locked position 84. The plurality of linkage members 82 includes a lever assembly 94 being pivotally connected to the other of the pair of mounting plates 42 at a pivot point 96. A first end 98 of the lever assembly 94 is pivotally connected to a first end 100 of a pair of bell cranks 102 and a second end 104 of the lever assembly 94 is pivotally connected to a first end 106 of a tie member 108 in a conventional manner. A second end 110 of the tie member 108 is pivotally connected to a first portion 112 of a rotating link 114 in a conventional manner. The rotating link 114 further includes a second portion 116 being pivotally connected to the first end 100 of the other of the pair of bell cranks 102 in a conventional manner. A pivot portion 118 of the rotating link 114 is attached to the connecting plate 44 in a pivotal manner of conventional construction. A second end 120 of the pair of bell cranks 102 is pivotally connected to a first end 122 of an adjustable member 124 attached thereto in a conventional manner. A second end 126 of the adjustable member 124 is attached to a locking member 128. In this application, the locking member 128 includes a latch 130 having a pair of tapered ends 132 each defining a mating surface 134 thereon. The pair of tapered ends 132 are spaced one from the other and centered about the centerline 45. A body 136 is interposed the pair of tapered ends 132. Attached to the body 136 a preestablished distance from the centerline 45 is the second end 126 of the adjustable member 124. The mating surface 134 defined on each of the pair of tapered ends 132 is spaced from the centerline 45 at generally an equal distance. The distance from the centerline 45 to the mounted position of the second end 126 of the adjustable member 124 on the body 136 and the distance from the mounted position of the second end 126 of the adjustable member 124 on the body 136 to the mating surface 134 are generally equal. Furthermore, the relative position on each side of the centerline 45 of the mounted position of the second end 126 of the adjustable member 124 on the body 136 and the mating surface 134 are symmetrical. In the assembled position with the attachment 18 connected to the stick 10 by the quick-disconnect coupler 12, the mating surface 134 of the corresponding one of the pair of tapered ends 130 is in contacting relationship with the mating surface 38 on the corresponding one of the pair of brackets 22 and the pair of tapered ends 130 are positioned within the cavities 39. In the open position 112 the mating surface 134 of the corresponding one of the pair of tapered ends 130 is not in contacting relationship with the mating surface 38 on the corresponding one of the pair of brackets 22 but is spaced therefrom. And, the pair of tapered ends 130 are positioned out of the cavity 39.

INDUSTRIAL APPLICATION

In use, a power device 8 such as a hydraulic excavator or backhoe, shown schematically, has the stick 10 extending therefrom to which is attached the bucket or an auxiliary attachment 18 used for a specific task. While performing the many tasks, the operator needs to perform a different task requiring a different attachment 18. Thus, the quick-disconnect device 12 comes into play. The operator initiates an operation to release the attachment 18 and the activation device 80 and the rod of the hydraulic cylinder 86 is compressed moving the plurality of linkage members 82. The plurality of linkage members 82 moves the latch 130 from the locked position 84 at one of the extremities of the preestablished configuration of the movement of the plurality of linkage members 82 to the other of the extremities of the preestablished configuration to the open position 83. The combination of the lever assembly 94 being pivoted about the pivot point 96, the first end 98 of the lever assembly 94 being pivotally connected to one of the pair of bell cranks at the first end 100, and the second end 104 of the lever assembly 94 being connected to the first end 106 of the tie member 108 and the rotating link 114 being pivoted about the pivot portion 118, the second portion 116 of the rotating link 114 being pivotally connected to the other of the pair of bell cranks 102 at the first end 100, and the first portion 112 of the rotating link 114 being connected to the second end 110 of the tie member 108, when activated by the cylinder 86, causing the pair of link members 94 to produce an axial movement which systematically function in harmony between the pair of bell cranks 102. Each of the adjustable members 124 exert a force on the body 136 of the locking member 128 causing the mating surfaces 134 on the pair of tapered ends 130 to move away from the inclined surfaces 36 on the pair of brackets 22. Thus, the pair of ends 130 move out of the cavity 39 allowing the attachment to be removed from the stick 10. The operator moves the stick 10 so that the portion of the cylindrical boss members 62 in contact with the portion of the pair of open-ended bores 34 and the pair of open ended elongate openings 32 become disengaged and moves the frame assembly 40 away from the attachment 18. Thus, the attachment 18 is disconnected from the power device 8.

Next, the operator moves the power device 8 into position so as to attach the other of the attachments 18. The operator moves the frame assembly 40 into position so that a portion of the cylindrical boss members 62 are in contact with the portion of the pair of open ended elongate openings 32, picks up the attachment 18 and rotates the attachment until the cylindrical boss members 62 are in contact with the portion of the pair of open-ended bores 34. The operator initiates an operation to attach the attachment 18 and the activation device 80 and the hydraulic cylinder 86 moving the plurality of linkage members 82. However, during this cycle, with the rod of the cylinder 86 compressed the plurality of linkage members 82 moves the from the open position 83 at one of the extremities of the preestablished configuration to the other of the extremities of the preestablished configuration to the locked position 84 causing the tie member 108 to systematically move the pair of bell cranks 102 to function in harmony. The adjustable members 124 exert a force on the body 136 of the locking member 128 causing the mating surfaces 134 on the pair of tapered ends 130 to move toward the inclined surfaces 36 on the pair of brackets 22. Thus, the pair of ends 130 move into the cavity 39 allowing the attachment to be attached in working relationship to the stick 10.

The position or spacing of the adjustable members 124 along the body 136 of the locking member 128 causes each of the pair of ends 130 to move uniformly and prevents cocking of the locking member 128. The spacing of the pair of ends 130 axially from the centerline 45 and being in contacting relationship with the spaced apart pair of brackets 22 on the attachment 18 insures that the connection between the power device 8 and the attachment is of structural integrity to withstand twisting, bending and additional induced forces.

Furthermore, the preestablished configuration of the plurality of linkage members 82, specifically the lever assembly 94, the rotating link 114, the tie member 108 and the pair of bell cranks 102 further position the locked position 84 within the preestablished so as to maintain the quick-disconnect coupler 12 in the locked position 84 even if the hydraulic cylinder 86 loses hydraulic power.

Other aspects, objects and advantages of this invention can be obtained from a study of the drawings, the disclosure and the appended claims.

We claim:

1. A quick-disconnect device comprising:

a pair of brackets being fixedly attached to an attachment, said pair of brackets include an upper end, a lower end, a front side, a back side, a pair of open ended elongate openings being axially aligned are positioned near the upper end and at the back side and a pair of open-ended bores being axially aligned are positioned near the lower end and open at the back side;

a frame assembly being attached to a power device;

an activation device being attached to the frame assembly, said activation device removably attaching said frame assembly to said attachment;

said activation device including a plurality of linkage members being movable between an open position and a locked position said plurality of linkage members defining a cam member having an over center or locking portion corresponding to the locked position and said plurality of linkage members include a pair of cam members; and a locking member including a latch having a pair of spaced apart ends which when in the locked position are in contacting relationship with said frame assembly.

2. The quick-disconnect device of claim 1 wherein said pair of brackets include an inclined surface extending from the lower end toward the upper end.

3. The quick-disconnect device of claim 1 wherein said frame assembly includes a pair of mounting plates having a plurality of boss members positioned thereon, said plurality of boss members being positioned on said pair of mounting plates to correspond to the position of said pair of open ended elongate openings and said pair of open-ended bores.

4. The quick-disconnect device of claim 1 wherein each of said pair of cam members includes a recess defining a preestablished configuration having an arcuate portion and said over center or locking portion.

5. The quick-disconnect device of claim 4 wherein during operation said activation device moves through the recess from an open position to a locked position.

6. The quick-disconnect device of claim 1 wherein a cavity is interposed the pair of brackets and the attachment.

7. The quick-disconnect device of claim 6 wherein said pair of spaced apart ends are positioned in the cavity at said locked position and are positioned out of the cavity at said open position.

8. The quick-disconnect device of claim 1 wherein said activation device includes a hydraulic cylinder.

9. The quick-disconnect device of claim 8 said hydraulic cylinder is pressurized and maintains the quick-disconnect device in the locked position.

10. The quick-disconnect device of claim 8 wherein said hydraulic cylinder losses pressure and said over center or locked position of said preestablished configuration maintains the quick-disconnect device in the locked position.

* * * * *